(12) United States Patent
Karlberg et al.

(10) Patent No.: US 12,579,297 B2
(45) Date of Patent: Mar. 17, 2026

(54) INCORPORATING LARGE LANGUAGE MODEL PROMPTS IN GRAPH QUERY LANGUAGE

(71) Applicant: Microsoft Technology Licensing, LLC, Redmond, WA (US)

(72) Inventors: Jan-Ove Almli Karlberg, Tromsø (NO); Steffen Viken Valvåg, Tromsø (NO); Tor Kreutzer, Harstad (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 18/209,742

(22) Filed: Jun. 14, 2023

(65) Prior Publication Data

US 2024/0419835 A1     Dec. 19, 2024

(51) Int. Cl.
*G06F 21/62* (2013.01)
*G06F 16/3329* (2025.01)

(52) U.S. Cl.
CPC ...... *G06F 21/6227* (2013.01); *G06F 16/3329* (2019.01); *G06F 2221/2113* (2013.01); *G06F 2221/2141* (2013.01)

(58) Field of Classification Search
CPC ............. G06F 21/6227; G06F 16/3329; G06F 2221/2113; G06F 2221/2141
See application file for complete search history.

(56) References Cited

U.S. PATENT DOCUMENTS

| | | | |
|---|---|---|---|
| 12,223,080 B1 * | 2/2025 | Al-Rikabi ............. | G06F 16/243 |
| 2022/0036153 A1 | 2/2022 | O'malia et al. | |

(Continued)

FOREIGN PATENT DOCUMENTS

| | | |
|---|---|---|
| CN | 113312501 A | 8/2021 |
| CN | 115248854 A | 10/2022 |

(Continued)

OTHER PUBLICATIONS

Mihaylov Todor et al. "Knowledgeable Reader: Enhancing Cloze-Style Reading Comprehension with External Commonsense Knowledge", May 21, 2018, https://arxiv.org/pdf/1805.07858 (Year: 2018).*

(Continued)

*Primary Examiner* — Hee K Song
(74) *Attorney, Agent, or Firm* — Schwegman Lundberg & Woessner, P.A.

(57)                    ABSTRACT

Systems and methods are directed to incorporating large language model (LLM) prompts into graph queries using graph query language and executing these graph queries. The system receives a graph query that includes a LLM prompt in the graph query language. The LLM prompt comprises an input context and a query to be answered. Based on the graph query, the system traverses a knowledge graph to obtain context data associated with the input context. The context data may be constrained by access control policies of an enterprise providing the knowledge graph. A context table may be generated using the context data based on the input context indicated in the LLM prompt. The system then invokes an LLM to determine a result by applying the query of the LLM prompt to the context data obtained from the traversal of the knowledge graph. The result is then presented on a user interface of a client device.

20 Claims, 6 Drawing Sheets

(56) References Cited

U.S. PATENT DOCUMENTS

| | | | | |
|---|---|---|---|---|
| 2022/0068462 A1* | 3/2022 | Dolan | ...................... | G10L 25/63 |
| 2022/0210201 A1* | 6/2022 | Kastroulis | ............... | H04L 63/10 |
| 2022/0407961 A1 | 12/2022 | Willshire et al. | | |
| 2024/0320257 A1* | 9/2024 | Amoateng | .......... | G06F 16/9535 |

FOREIGN PATENT DOCUMENTS

| | | |
|---|---|---|
| CN | 115577086 A | 1/2023 |
| KR | 20220158573 A | 12/2022 |
| WO | 2021038380 A1 | 3/2021 |

OTHER PUBLICATIONS

Jared Spataro, "Introducing Microsoft 365 Copilot—your copilot for work—The Officiccial Microsoft Blog", Mar. 2023, https://blogs.microsoft.com/blog/2023/03/06/introducing-microsoft-365-copilot-your-copilot-for-work/ (Year: 2023).*

"Java—Node level security in neo4j—Stack Overflow", Retrieved from the Internet URL: —https://stackoverflow.com/questions/44811507/node-level-security-inneo4j, Jun. 28, 2017, 01 Pages.

Bratanic, Tomaz, et al., "Generating Cypher Queries with ChatGPT 4 on Any Graph Schema", Retrieved from the Internet URL: —https://neo4j.com/developer-blog/generating-cypher-queries-withchatgpt-4-on-any-graph-schema/, May 2, 2023, 14 Pages.

International Search Report and Written Opinion received for PCT Application No. PCT/US2024/031338, Sep. 9, 2024, 19 pages.

Mihaylov, et al., "Knowledgeable reader: Enhancing cloze style reading comprehension with external commonsense knowledge", In Repository of arXiv:1805.07858, May 21, 2018, 19 Pages.

Spataro, et al., "Introducing Microsoft 365 Copilot—your copilot for work-The Official Microsoft Blog", Retrieved from the Internet URL: —https://blogs.microsoft.com/blog/2023/03/16/introducing-microsoft-365-copilot-your-copilot-for-work/, Mar. 16, 2023, 07 Pages.

Kellner, et al., "Prompting Is Programming: A Query Language For Large Language Models", In Repository of arXiv:2212.06094v1, Dec. 12, 2022, pp. 1-28.

Moiseev, et al., "SKILL: Structured Knowledge Infusion for Large Language Models", In Proceedings of the Conference of the North American Chapter of the Association for Computational Linguistics: Human Language Technologies, Jul. 15, 2022, pp. 1581-1588.

Ni, et al., "Knowledge Graph and Deep Learning-based Text-to-GraphQL Model for Intelligent Medical Consultation Chatbot", In Journal of Information Systems Frontiers, Jul. 6, 2022, 20 Pages.

Prystawski, et al., "Psychologically-informed chain-of-thought prompts for metaphor understanding in large language models", In Repository of arXiv:2209.08141v1, Sep. 16, 2022, pp. 1-12.

Yasunaga, et al., "QA-GNN: Reasoning with Language Models and Knowledge Graphs for Question Answering", In Proceedings of the Conference of the North American Chapter of the Association for Computational Linguistics: Human Language Technologies, Jun. 6, 2021, pp. 535-546.

Ye, et al., "Large Language Models are Versatile Decomposers: Decompose Evidence and Questions for Table-based Reasoning", In Repository of arXiv:2301.13808v1, Jan. 31, 2023, pp. 1-15.

International Preliminary Report on Patentability (Chapter I) received for PCT Application No. PCT/US2024/031338, mailed on Dec. 26, 2025, 09 pages.

* cited by examiner

INCORPORATING LARGE LANGUAGE MODEL PROMPTS IN GRAPH QUERY LANGUAGE

TECHNICAL FIELD

The subject matter disclosed herein generally relates to execution of graph queries. Specifically, the present disclosure addresses systems and methods that incorporate large language model (LLM) prompts into graph queries using native graph query language and execute these graph queries.

BACKGROUND

Graph abstraction is a powerful tool that allows for reasoning over connected data. Knowledge graphs organize data from multiple sources and provides a collection of linked descriptions of entities represented as nodes and relationships/actions between the entities represented as edges. In the case of an enterprise knowledge graph, the knowledge graph connects or links together knowledge, resources, people, and other organizational data within the enterprise. In some cases, the data comprising the knowledge graph originates from a plurality of heterogenous systems whereby each system may be built according to specific requirements of the data hosted therein. Conventionally, a graph query constructed with a standard graph query language can be used to find information from the knowledge graph.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments incorporate generative model prompts into graph queries using native or standard graph query language and executes the graph queries on an enterprise knowledge graph. Example systems and methods are discussed in which the generative model prompts comprise large language model (LLM) prompts and the generative models executing the prompts are LLMs. However, alternative embodiments can contemplate using other forms of generative models or generative artificial intelligence (AI) systems (e.g., diffusion model for images) and corresponding prompts.

Figure 1:
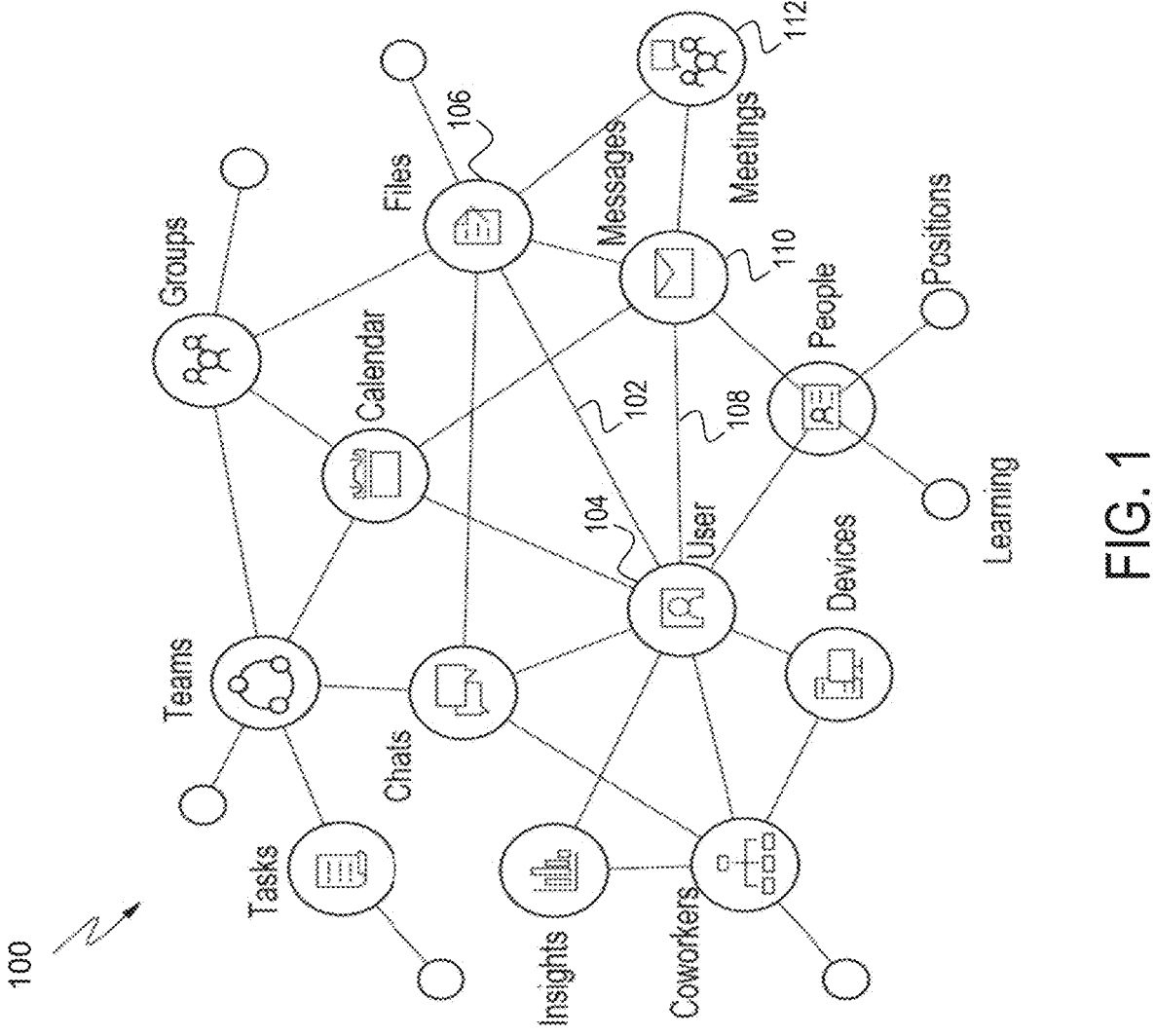
FIG. 1 illustrates an example of an enterprise knowledge graph.

The enterprise knowledge graph is a collection of assets, content, and data that uses data models to describe people, places, and things and their relationships. The people, places, and things (collectively referred to as "entities") make up the nodes of the enterprise knowledge graph while edges show a relationship between two nodes. FIG. 1 illustrates an example of an enterprise knowledge graph 100. Here, the enterprise knowledge graph 100 comprises nodes including, for example, tasks, chats, calendars, teams, devices, meeting, documents, messages, and other entities within the enterprise. Edges shown between the various nodes provide relationships between the nodes. For instance, a user may have created or modified various files, thus resulting in edge 102 between a user node 104 and a files node 106. Similarly, the user may have sent or received various messages (e.g., resulting in an edge 108 between the user node 104 and a message node 110) and these messages may indicate meetings (e.g., resulting in an edge between the message node 110 and a meetings node 112). As further examples, users and files can be tied together through edges that capture modifications, views, comments, and/or sharing; files can be connected to channels or sites by edges such as "shared in" and "stored in;" and emails can be connected to users and groups by edges such as "sent" and "received." Both files and users can also be connected to topics through edges that capture relatedness and users being experts on something. These various nodes may be associated with different data stores in the enterprise. Example embodiments provide systems and methods that can efficiently access these data stores to construct the enterprise knowledge graph and subsequently perform a query for information.

The use of LLMs is become prevalent in all areas of technology. These LLMs have proven to be extremely capable of a wide range of tasks from text summarization to image generation. Example embodiments add extensibility to query language where incorporation of LLMs is desired. An initial way of integrating LLMs to analyze databases of an enterprise is to query the database for content, obtain the response, and then separately launch a LLM for processing. However, if multiple round trips are required, there will be back and forth between systems which results in utilizing more system resources. Additionally, this initial way does not provide an option to summarize and continue with a further query.

To remove the need for the back-and-forth and thus reduce system resource usage, a technical solution to this technical problem comprises incorporating LLM prompts into graph queries using native graph query language which results in a single graph query being processed and a single call being made. Specifically, a graph query specifies context data that should be obtained by graph traversal and a LLM prompt (e.g., a generative prompt). The graph query triggers a knowledge graph traversal to obtain the context data that is then used by an LLM to answer a question or query posed in the LLM prompt.

Using Cypher query language as an example, a plurality of keywords are used for specifying patterns, filtering patterns, and returning results. Some of the most commonly used keywords are MATCH, WHERE, and RETURN. MATCH is used to describe a search pattern for finding nodes and relationships. WHERE is used to provide a constraint or filter to the pattern. RETURN formats and organizes the results for output. For example, a generic Cypher query can be written as:

MATCH (variable: Label1)–[variable:Relationship_ type]→(variable: Label2)
WHERE Constraint='Constraint Label'
RETURN Result Example embodiments add support for new keywords used to interact with an LLM such that capabilities of the LLM can be included directly in the graph query. In order to remain compliant with syntax of industry standard query language, such as Cypher, this is done by representing usage of LLMs through functions indicated in LLM prompts. One way to execute an LLM prompt is to provide some input context along with a query to be answered based on the input context. For example, a graph query with an LLM prompt can be written as:

```
MATCH (variable: Label1) - [variable: Relationship_type] -> (variable:
Label2)
WHERE Constraint = 'Constraint Label'
RETURN Prompt(['input context'], query to be answered)
```

The input context can be structured or non-structured. For non-structured input context, context data can just be aggregated or added to a list. For structured input context, the context data can be formatted into a context table.

As one example, the query language can be extended with a LLM prompt that indicates to construct an input context table based on context data obtained from a graph traversal and the query to be executed over the context table. The LLM prompt can be implemented in an extensible manner where a number of arguments to the LLM prompt is arbitrary. This allows for construction of context tables of arbitrary size and shape. The LLM prompt may be implemented as: Prompt (string [ ] args).

By convention, a first argument is a list of strings that contains column headers for a context table. The list has length N, yielding N columns. Next N arguments identify variables from a graph traversal (e.g., graph query execution) that should be inserted into the context table. A final argument is the query to be answered that should be executed over the context data—the context table in this case. For example, a graph query with an LLM prompt that constructs a context table can be written as:

```
MATCH (variable: Label1) - [variable: Relationship_type] -> (variable:
Label2)
WHERE Constraint = 'Constraint Label'
RETURN Prompt(['list of strings for column headers'], variables to be
inserted in context table, query to be answered)
```

Figure 2:
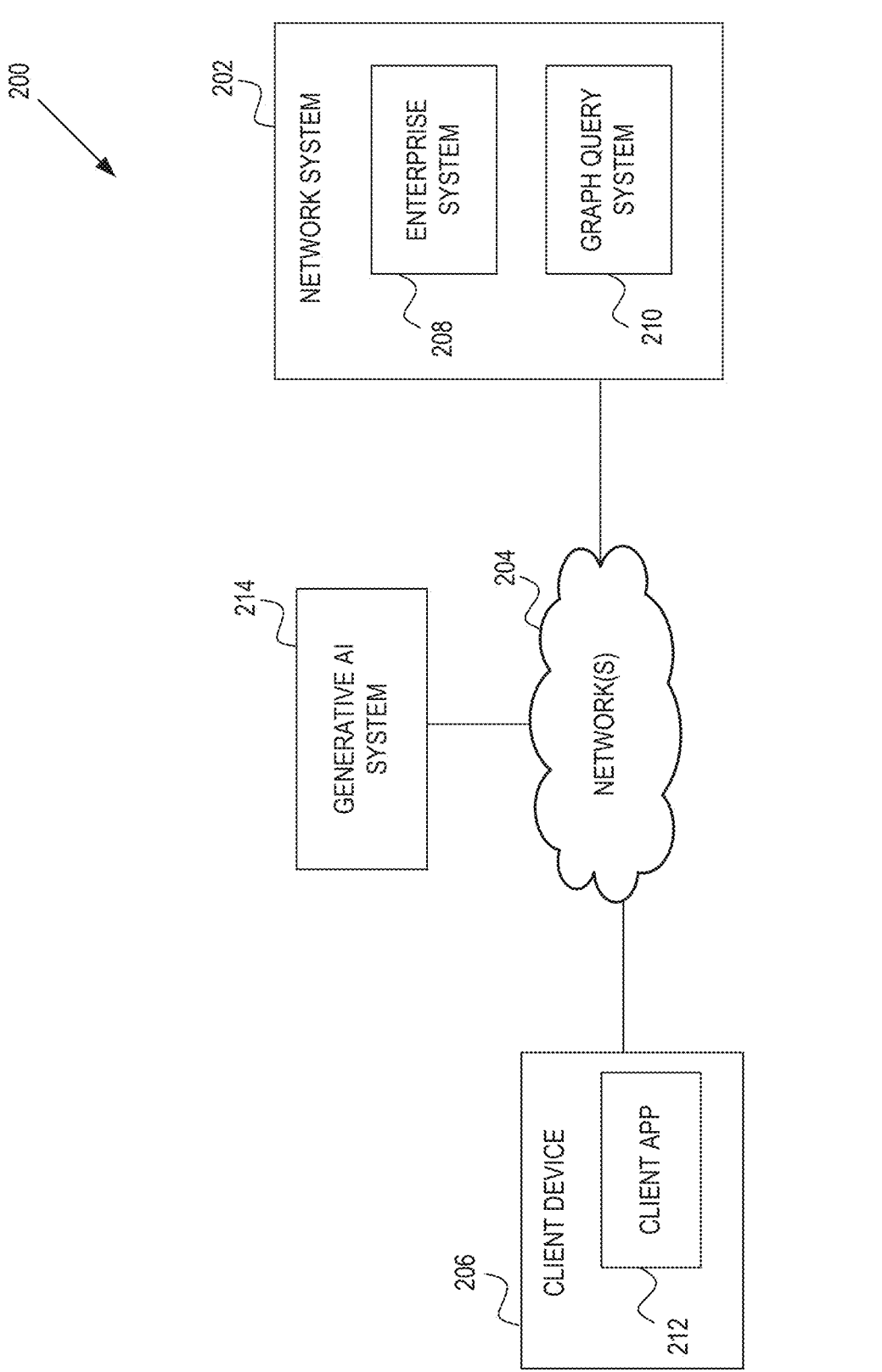
FIG. 2 is a diagram illustrating a network environment suitable for incorporating large language model (LLM) prompts into graph queries using native graph query language and executing the graph queries, according to some example embodiments.

FIG. 2 is a diagram illustrating a network environment 200 suitable for incorporating a large language model (LLM) prompt into a graph query using standard or native graph query language and executing the graph query. A network system 202 is communicatively coupled, via a network 204, to a client device 206. In some embodiments, the network system 202 is associated with a single entity and comprises an enterprise system 208 and a graph query system 210. In alternative embodiments, the graph query system 210 may be located separate from a network system that includes the enterprise system 208, whereby the graph query system 210 is communicatively coupled to the enterprise system 208.

The enterprise system 208 is configured to track and control operations of an enterprise or organization associated with the network system 202. In some cases, the enterprise system 208 includes a cloud-based software-as-a-service (SaaS) system that provides a plurality of applications, protocols, and functionalities to the enterprise that allow the enterprise to integrate business processes and share information across business functions and employee hierarchies. For instance, there may be a service hosting contacts, a second service hosting profiles for people, a third service hosting documents and connections between people and documents, and so forth. In example embodiments, the network system 202 is configured to generate an enterprise knowledge graph for the enterprise system 208 that links all these isolated services together to form a logical graph. Such an enterprise knowledge graph can be traversed for data in the enterprise by the graph query system 210.

The graph query system 210 is a component of the network system 202 that performs graph query evaluations of the knowledge graph of the enterprise. Example embodiments use the graph query system 210 to perform a knowledge graph traversal of an enterprise knowledge graph to obtain context data, format the context data, and invoke a generative AI model or system (e.g., LLM) to perform analysis based on the context data. The generative AI system is invoked with the LLM prompt in the graph query. In some embodiments, the network system 202 makes calls to an external generative artificial intelligence (AI) system 214 (e.g., a large language model) to perform the LLM prompt. In these embodiments, the invocation can be through an application programming interface (API) through a remote procedure call (RPC). In other embodiments, the generative AI system 214 is embodied within the network system 202. In these cases (e.g., where the generative AI system 214 is hosted on a same machine/server as the graph query system 210), normal inter-process communication (IPC) can be applied or execution of a procedure, method, or function call used to invoke the generative AI system. All of these operations are executed based on a single graph query and a single call to the graph query system 210. The network system 202 and graph query system 210 will be discussed in more detail in connection with FIG. 3 below.

In various embodiments, the generative AI system 214 is configured to receive the query to be answered and the context data obtained from the knowledge graph traversal. In some cases, the context data may be formatted into a context table or a context list. Analysis of the context data by the generative AI system 214 or LLM will provide a result to the query. The result can be presented to the client device 206 and/or be used as context or input for a further query as will be discussed further below.

The client device 206 is a device of a user of the network system 202. In some cases, the user has an enterprise-related question they want answered by the network system 202.

For instance, the user is using a word processing application (e.g., Microsoft Word) and types a question into a chat interface, whereby the question is based on a document they are working on. For example, the user can ask, based on the titles of documents modified by the user's contacts, what are the three most important topics. In background, a first LLM generates a graph query (e.g., in Cypher language) that itself incorporates another call to a second LLM, whereby the second LLM processes the question based on actual data obtained from the traversal of the enterprise knowledge graph.

In other cases, the network system 202 provides a feed experience which presents enterprise-specific information that is determined using a graph query having an LLM prompt. For instance, the feed may present the top three topics the user's team has been working on for the past week.

The client device 206 may comprise, but is not limited to, a smartphone, tablet, laptop, multi-processor systems, microprocessor-based or programmable consumer electronics, game consoles, a server, or any other communication device that can perform operations with respect to the network system 202 via the network 204. In example embodiments, the client device 206 comprises one or more client applications 212 that communicate with the network system 202 for added functionality. For example, the client application 212 may be a local version of an application or component of the network system 202. Alternatively, the client application 212 exchanges data with one or more corresponding components/applications at the network system 202. For instance, the client application 212 can be a mobile productivity application (e.g., Microsoft 365 application) and the corresponding application at the network system 202 is Microsoft 365. The client application 212 may be provided by the network system 202 and/or downloaded to the client device 206.

Depending on the form of the client device 206, any of a variety of types of connections and networks 204 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 204 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 204 is a Wireless Fidelity (Wi-Fi, IEEE 802.11x type) connection, a Worldwide Interoperability for Microwave Access (WiMAX) connection, or another type of wireless data connection. In some embodiments, the network 204 includes one or more wireless access points coupled to a local area network (LAN), a wide area network (WAN), the Internet, or another packet-switched data network. Accordingly, a variety of different configurations are expressly contemplated.

In example embodiments, any of the systems, devices, or networks (collectively referred to as "components") shown in, or associated with, FIG. 2 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 2 or their functions may be combined, or the functions described herein for any single component may be subdivided among multiple components. Additionally, any number of client devices 206 may be embodied within the network environment 200. While only a single network system 202, and generative AI system 214 are shown, alternative embodiments contemplate having more than one network system 202 (e.g., each localized to a particular region) and/or generative AI systems 214 to perform the operations discussed herein.

Figure 3:
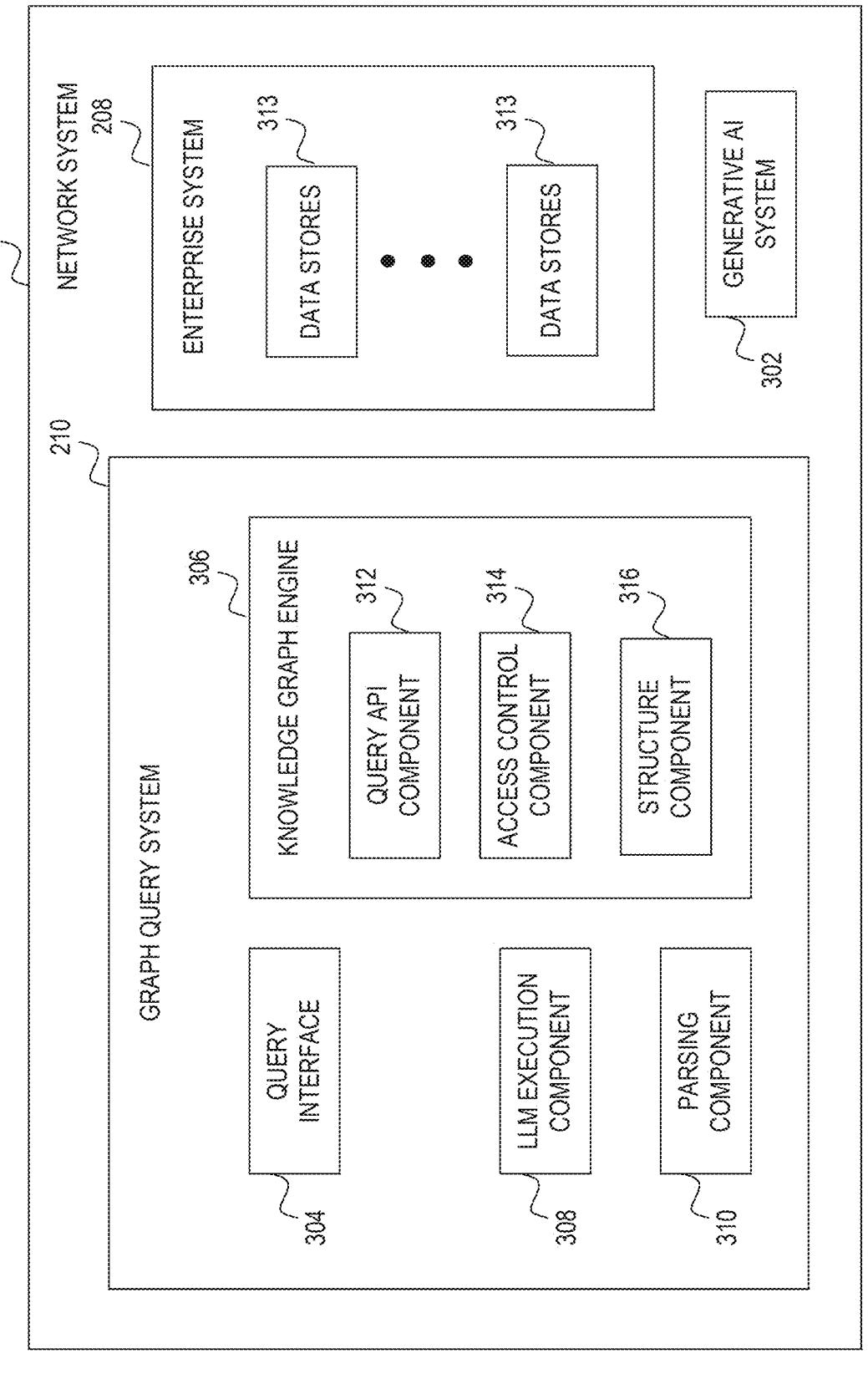
FIG. 3 is a diagram illustrating components of a network system for incorporating LLM prompts into graph queries using native graph query language and executing the graph queries, according to some example embodiments.

FIG. 3 is a diagram illustrating components of the network system 202 for incorporating LLM prompts into a graph query using graph query language and executing the graph query, according to some example embodiments. To enable these operations, the network system 202 comprises the enterprise system 208, the graph query system 210 and, in some embodiments, an internal generative AI system 302 (also referred to herein for simplicity as an LLM), all communicatively couple to each other.

The graph query system 210 performs graph query evaluations of a knowledge graph of an enterprise (e.g., the enterprise system 208) by traversing an enterprise knowledge graph to obtain context data, formatting the context data, and invoking an LLM (e.g., via a call or IPC) to perform a query analysis based on the obtained context data in response to a single graph query. In one embodiment, the graph query system 210 comprises a query interface 304, a knowledge graph engine 306, a LLM execution component 308, and a parsing component 310.

The query interface 304 is configured to manage receipt and processing of a question or query by exchanging data with various components of the networking environment 200. Accordingly, the query interface 304 receives a question to be answered which may be in a natural language format or presented in a graph query language. In the case of a natural language formatted question, the query interface 304 passes the question to the LLM execution component 308 which invokes (e.g., via an API call, function call, IPC) a LLM (e.g., the external generative AI system 214 or the internal generative AI system 302) to generate a graph query in a native graph query language (e.g., Cypher). If the question is already presented in standard graph query language, the query interface 304 works with the other components of the graph query system 210 to process the graph query.

The knowledge graph engine 306 is configured to evaluate the graph query over the distributed enterprise system 208 to obtain context data from the enterprise knowledge graph. Upon receipt of the graph query, a query API component 312 manages the traversal of the enterprise knowledge graph to obtain context data to which the query will be applied. In one embodiment, the query API component 312 parses the graph query and compiles it into individual operations to be executed in order to satisfy the graph query. The operations are mapped to different underlying data stores 313 of the enterprise system 208. The data stores 313 may be accessed through corresponding storage adapters or interfaces associated with the query API component 312.

For every node or edge that is visited in the enterprise system 208, access control policies need to be honored. In some embodiments, an access control component 314 manages the access control. The access control component 314 identifies a user associated with the question or query and determines access control policies and rights associated with the user. In one embodiment, the access control policies and rights are provided to the query API component 312 and utilized while traversing the enterprise knowledge graph. In other embodiments, the context data obtained by the query API component 312 is filtered by the access control component 314 prior to execution of the LLM prompt.

In some embodiments, the LLM prompt indicates a structure of the context data (or context input) that will be used to answer the question/query. In some cases, the structure is a context table. As discussed above, the LLM prompt may take the form of Prompt(['list of strings for column headers'], variables to be inserted in context table, query to be answered). In these cases, a structure component 316 creates the context table based on the LLM prompt.

As an example, assume a graph query in Cypher language as follows:

```
MATCH (d:DUCK) - [r]- (other)
WHERE d.name = 'Donald Duck'
RETURN Prompt(['AnchorName', 'Relationship Type', 'OtherName'],
d.name, type(r), other.name, 'What are the names of Donalds nephews?'
```

The above graph query defines a pattern that wants to match nodes labeled "duck" and follow any relationships to other nodes in the databases. A constraint placed on "duck" is the name "Donald Duck." The schema for the function or LLM prompt is basically what is expected as input parameters. Here, a name parameter is first, a relationship type is second, and the other name in the relationship is third for this graph query. The LLM prompt ends with the question to be answered. The LLM prompt may have a variable number of arguments, but effectively includes a command/question (e.g., who are the nephews of Donald Duck) and context to the prompt (e.g., table with three headers: anchor name, relationship, and other name). Both the question and the input data (e.g., context data obtained from the graph traversal) go to the LLM as one unit.

Based on this graph query, the query API component 312 spans a graph over Duck Burg (e.g., the enterprise system 208) and anchors in Donald Duck. Edges connecting Donald Duck to other entities in Duck Burg are determined. The LLM prompt is used by the structure component 316 to format the context table with the name of the anchor node (i.e., Donald Duck), a type of relationship between the anchor node and the node at the opposite end, and a name of the node at the opposite end of the relationship.

An example context table generated by the structure component 316 for the above graph query may be the following:

| AnchorName | Relationship Type | OtherName |
|---|---|---|
| Donald Duck | UNCLE_OF | Huey Duck |
| Donald Duck | UNCLE_OF | Dewey Duck |
| Donald Duck | UNCLE_OF | Louis Duck |
| Donald Duck | NEPHEW_OF | Scrooge McDuck |
| Donald Duck | IN_DEBT_OF | Scrooge McDuck |
| Donald Duck | BOYFRIEND_OF | Daisy Duck |
| Donald Duck | FRIENDS_WITH | Mickey Mouse |
| Donald Duck | GRANDSON_OF | Grandma Duck |

The LLM prompt receives the above context table as its input data. In one embodiment, the query API component 312 makes a call to the generative AI system 214 or 302. The generative AI system 214 or 302 may be accessed through a corresponding adapter or interface associated with the query API component 312. The generative AI system 214 or 302 then interprets the context table to find Donald Duck and relationships to nephews Huey, Dewey, and Louie.

The parsing component 310 is configured to manage graph queries that utilize a LLM prompt as an intermediate step in a query process. In some cases, the parsing component 310 converts textural output from the LLM into structured data. Since a formulation of a LLM prompt can affect a likely output format from the LLM (e.g., output a JSON array of {key, value} pairs), having an ability to specify both at query time is important for flexibility.

The parsing component 310 can also convert the LLM output to a set of nodes matched by the graph query leading up to the LLM prompt. When a context table is populated by properties of nodes, node identifiers can also be included. Then, the LLM output can potentially refer back to the node identifiers, be mapped back to concrete nodes, and the graph query can continue to span the graph from those nodes. In some cases, it is also possible to have the LLM return the response in a format such that its output can be used directly to continue the graph query execution. An example graph query illustrating this is shown below:

```
MATCH (me:ME)-[c:HasContact]->(contact)-[m:ModifiedByUser]->(doc)
WHERE c.contactType = 'Profile'
WITH Prompt(['DocumentTitle', 'UserId'], doc.'Visualization.Title',
contact.ObjectId, 'Who is the most prolific author? Return UserId of this
person') AS userId
MATCH (user) WHERE user.ObjectId = userId
RETURN user.Name
```

Another option is to use the output from the LLM prompt as input to an open-ended search query, leveraging that search for continued graph traversal. For example,

```
MATCH (me:ME)-[c:HasContact]->(contact)-[m:ModifiedByUser]->(doc)
WHERE c.contactType = 'Profile'
WITH Prompt(['Name', 'DocumentTitle'], c.'name.displayName',
doc.'Visualization.Title', 'What are the top 3 topics the team has worked
on?') AS teamSummary
MATCH (searchResult) WHERE searchResult.Content CONTAINS
teamSummary.Tokenize( )
```

Furthermore, LLM prompts are currently limited by size (e.g., string length) of the LLM prompt. When prompt max size is encountered, one option is to execute multiple parallel LLM prompts with parts of the input data, and then execute a subsequent LLM prompt that acts on these partial responses. Such a map-reduce like pattern can easily be hidden within the implementation of the LLM prompt function that is invoked during query execution. Likewise, it is possible to implement LLM prompt functions with different signatures. This is convenient, for example, when it is desired that the prompt execute over an entire graph traversal state rather than having specific properties represented in table form.

The parsing component 310 can also be used when the LLM is not accurate. The graph query may ask for a particular result in a particular format, but the LLM may only predict what is a next appropriate word that leads from the prompt. In these cases, the result will not be exactly what was asked for. In those case, the parsing component 310 processes the output of the LLM (e.g., parses the output) to produce something that is more usable in a query context. For example, the parsing component 310 can process the output in a structured language in order to extract important bits or use LLM to reprocess the output, find an intent, try to be more specific, and get the output into the specific format.

While the graph query system 210 is shown as part of the network system 202, alternative embodiments may contemplate have some or all of the operations occurring at the client device 206. For example, some of the components of the graph query system 210 can be embodied in the client application 212 operating on the client device 206.

Figure 4:
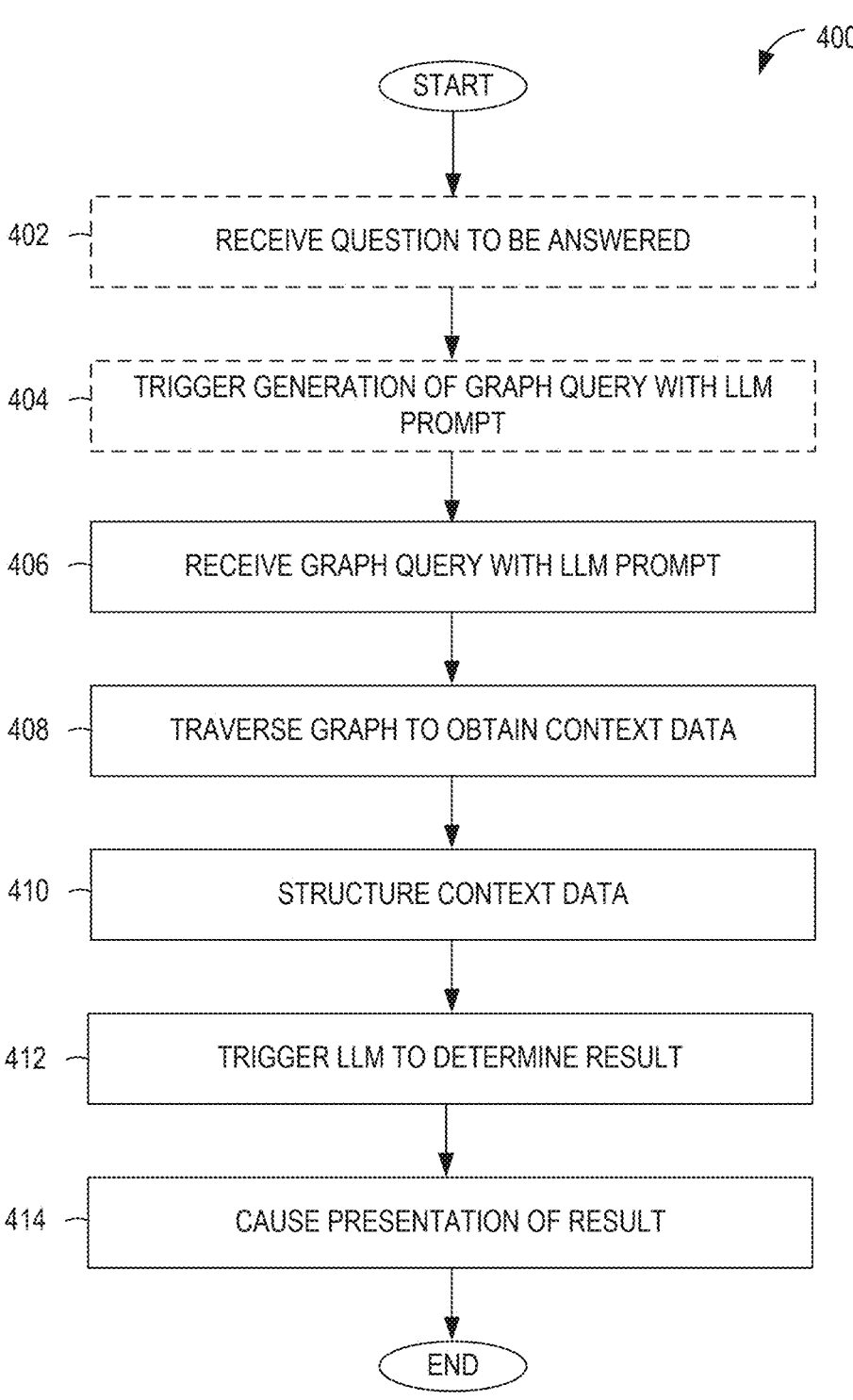
FIG. 4 is a flowchart illustrating operations of a method for incorporating LLM prompts into graph queries using native graph query language and executing the graph queries, according to some example embodiments.

FIG. 4 is a flowchart illustrating operations, performed by the network system 202, of a method 400 for incorporating an LLM prompt into a graph query in standard or native graph query language and executing the graph query, according to some example embodiments. Operations in the method 400 may be performed by the network system 202 in the network environment 200 described above with respect to FIG. 2 and FIG. 3. Accordingly, the method 400 is described by way of example with reference to these components in the network system 202. However, it shall be appreciated that at least some of the operations of the method 400 may be deployed on various other hardware configurations or be performed by similar components residing elsewhere in the network environment 200. Therefore, the method 400 is not intended to be limited to these components.

In operation 402, the query interface 304 receives a question to be answered. Because the question is in a natural language format, the graph query system 210 will need to "translate" the natural language question into a graph query in a native graph language.

In operation 404, the query interface 304 triggers generation of the graph query with a LLM prompt. For example, the query interface 304 passes the question to the LLM execution component 308 which invokes a LLM (e.g., the external generative AI system 214 or the internal generative AI system 302) to generate a graph query in a native graph query language (e.g., Cypher) that includes the LLM prompt. The invocation can be through an API call (e.g., for an external LLM), a function call, or IPC (e.g., for an LLM operating on a same machine as the graph query system 210). It is noted that operations 402 and 404 are optional and will not be performed if the question is received already in an LLM prompt of a graph query in the native graph query language.

In operation 406, the knowledge graph engine 306 receives the graph query with the LLM prompt. The knowledge graph engine 306 is configured to evaluate the graph query over the distributed enterprise system 208 to obtain context data from the enterprise knowledge graph. An example graph query that anchors on a user providing a question, follows edges for documents that the user modified, and follows other modifications to the same documents to find other people that modified the documents can be written as:

```
MATCH (me:ME)-[c:HasContact]->(contact)-[m:ModifiedByUser]->(doc)
WHERE c.contactType = 'Profile'
RETURN Prompt(['Name', 'DocumentTitle'], c.`name.displayName`,
doc.`Visualization.Title`, 'What are the top 3 topics the team has worked
on?')
```

It is noted that by simply tweaking the question, the data retrieved from the underlying graph structure can be leveraged in new and powerful ways. For example, context data from the same graph traversal may be used to answer other questions without having to perform an additional traversal. Other relevant questions that can be executed over the exact same graph traversal include, for example, "Who is the most prolific author?" and "What is the number one topic the author has worked on?"

In operation 408, the knowledge graph engine 306 traverses the enterprise knowledge graph to obtain context data based on the graph query. Upon receipt of the graph query, the query API component 312 manages the traversal of the enterprise knowledge graph. In one embodiment, the query API component 312 parses the graph query and compiles it into individual operations to be executed in order to satisfy the graph query, whereby the operations are mapped to different underlying data stores 314 of the enterprise system 208. The data stores 314 are accessed through corresponding storage adapters or interfaces associated with the query API component 312.

Continuing the example above, the graph query finds matching nodes labeled "me" (node representing the user in the graph) and finds contacts that the user has, whereby the constraint is that a contact type be a profile contact. Files modified by those users are identified. This context data can then handed over to the LLM prompt function.

In some cases, the enterprise data is restricted by access control policies. For example, the access control component 314 identifies a user associated with the question or query and determines access control policies and rights associated with the user. The access control policies and rights are provided to the query API component 312 and utilized while traversing the enterprise knowledge graph. Alternatively, the context data obtained by the query API component 312 is filtered by the access control component 314 prior to execution of the LLM prompt.

In operation 410, the structure component 316 structures the context data. In some cases, the LLM prompt indicates a structure of the context data (or context input) that will be used to answer the question/query. The structure can be a context table. In these cases, operation 410 is performed. Continuing the above example, the LLM prompt provides a schema of the arguments expected as the input data. Here, the input data includes the display name of the contact and the document title of the document.

In some cases, the context data may be unstructured or not required or suitable to be formatted into a context table. Context tables may be useful for text results. If the LLM takes other input, then the LLM prompt may look slightly different. For instance, the first argument rather than being how to construct a context table, may describe how to get image data or audio data. As an example, if the LLM takes as input just a list of images, then a context table is not necessary. Here, the LLM prompt can indicate to list the images and a command (as opposed to a question). An example graph query illustrating this may be:

```
MATCH (me:Me) - [:Uploaded] - >(i:Images)
RETURN Prompt (i.Data, "Create a collage of the input images")
```

The above graph query indicates using the graph structure anchoring in the user and following edges to images that the user has uploaded. These images are given the variable name I. The prompt (e.g., a generative prompt as opposed to an LLM prompt) indicates a first argument is the context—the image data. Based on the image data and in response to the command, a collage of the images are to be created.

In operation 412, the knowledge graph engine 306 (e.g., via the query API component 312) invokes an LLM (e.g., the generative AI system 214 or 302) to determine the result. For example, the query API component 312 makes a call (e.g., through corresponding adapter or interface associated with the query API component 312) to the generative AI system 214 with the LLM prompt and the context data. The invocation can also be through a procedure, method, or function call or IPC for an LLM operating on a same machine/server as the graph query system 210. The LLM then interprets the context data to determine the answer or result. In the first example above, the user prompt or question is "What are the top three topics the team has worked on?" Here, additional knowledge that is not explicitly represented in the graph is determined by the LLM based on the input data (e.g., based on the title of each document). The result of this query can be a response having a form of "The team has worked on the following three topics: 1) Performance in Subsystem X. 2) Introducing feature Y to pilot customers. 3) Planning of work for FY24."

Without example embodiments, some heuristic, algorithm, or approach will need to be implemented that can infer and understand what topics are for these documents and which are most prevalent (e.g., counting, disambiguation). Alternatively, the results from the graph query can be retrieved and then sent to the generative AI system as a subsequent query with performance implications and engineering overhead that is introduced. The benefit of being able to do this inline in a single graph query becomes even greater when the results from the generative AI system are used as an intermediate result for continued spanning of the enterprise knowledge graph.

In the image example above, the model executing the prompt may be a diffusion model for images instead of an LLM. Thus, the generative AI system 214 or 302 is not limited to an LLM. Furthermore, similar processes can be used to find audio data instead of text or image data. Additionally, other results can be generated by the generative AI system 214 or 302 based on questions or commands included in the generative prompt. For instance, the generative AI system 214 or 302 can construct a song or an image, using an appropriate generative model, based on information extracted from documents.

In operation 414, the result is presented on a client device. In some embodiments, the result is presented in a user experience feed. In some embodiments, the result is presented on a user interface through which a user presented the question to be answered or a command to be performed. Further still, the result can be presented in response to a chat input. In these cases, the result can be provided in a chat window, or the result can be presented in a format that can be incorporated into a document being edited through the productivity application. For example, the result can be presented inline in a document being edited using the productivity application but visually distinguished (e.g., in a different text color, highlighted).

Figure 5:
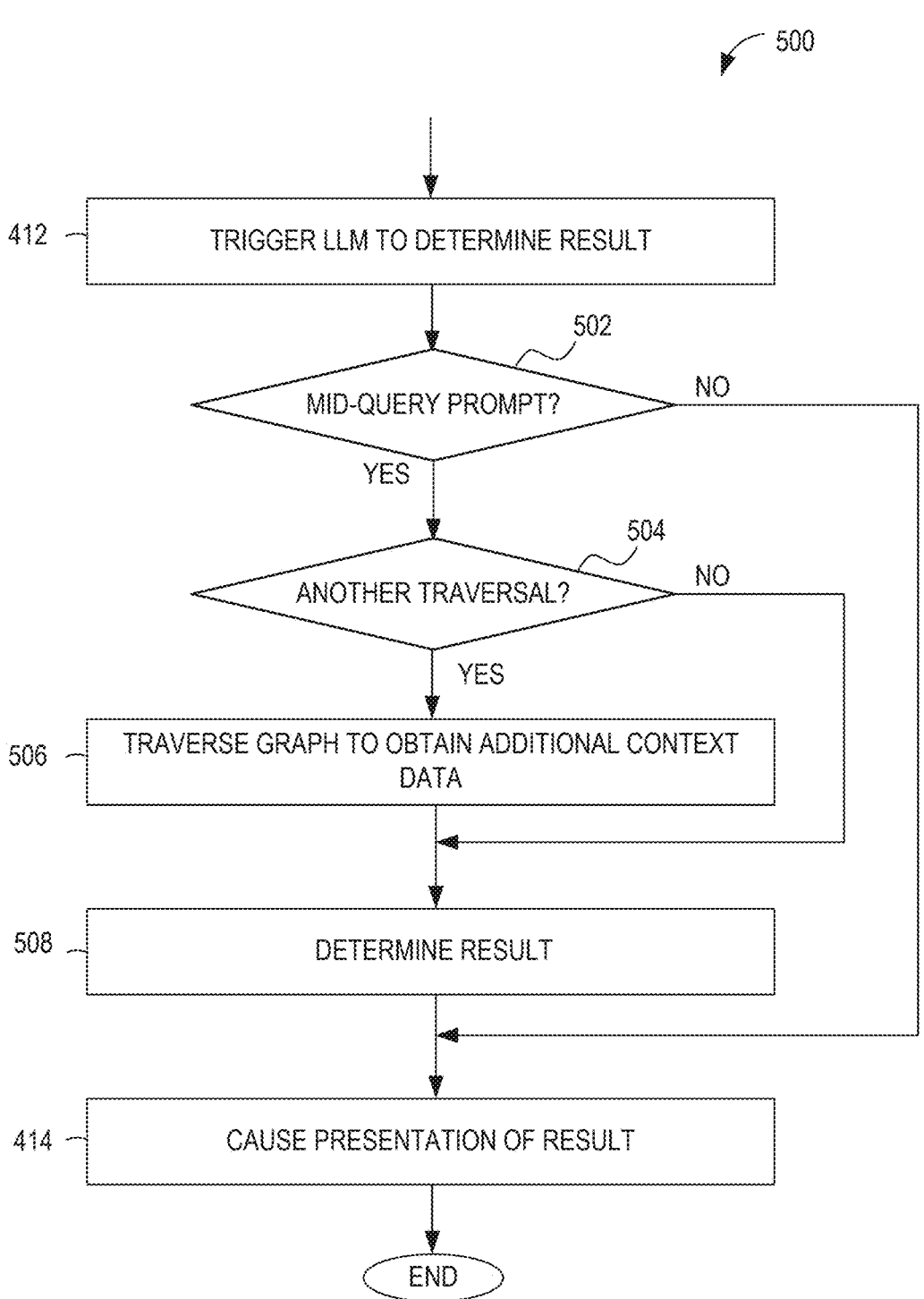
FIG. 5 is a flowchart illustrating operations of a method for executing a graph query comprising a mid-graph query LLM prompt, according to some example embodiments.

FIG. 5 is a flowchart illustrating operations, performed by the network system 202, of a method 500 for executing a graph query comprising a mid-query LLM prompt, according to some example embodiments. Operations in the method 500 may be performed by the network system 202 in the network environment 200 described above with respect to FIG. 2 and FIG. 3. Accordingly, the method 500 is described by way of example with reference to these components in the network system 202. However, it shall be appreciated that at least some of the operations of the method 500 may be deployed on various other hardware configurations or be performed by similar components residing elsewhere in the network environment 200. Therefore, the method 500 is not intended to be limited to these components.

In operation 502, a determination is made whether the LLM prompt is mid-query (e.g., in the middle of the graph query). If the LLM prompt is not mid-query, then the method 500 is the same as the method 400 and the result is presented on one or more client devices in operation 414. However, if the LLM prompt is mid-query, then a determination is made whether another graph traversal is needed, in operation 504.

Continuing with the first example from FIG. 4, assume that, based on the result for the top three topics the team has worked on, the user is interested in documents that their manager has modified that matches these topics. The graph query may be as follows:

```
MATCH (me:ME)-[c:HasContact]->(contact)-[m:ModifiedByUser]->(doc)
WHERE c.contactType = 'Profile'
WITH Prompt(['Name', 'DocumentTitle'], c.`name.displayName`,
doc.`Visualization.Title`, 'What are the top 3 topics the team has worked
on?') AS top3Topics
MATCH (me:ME)
<-[:ManagerOf]-(manager)-[:Modified]->(managerDocs)
WHERE managerDocs.topics CONTAINS top3Topics
RETURN mangerDocs
```

In the above example, the first step of the graph query has been performed and the top three topics that the team has worked on determined. The graph query continues using the results (i.e., top three topics) as a filter to a next portion of the graph query. The top three topics are now anchors and the graph query system 210 determines all documents that the user's manager has read that matches these topics. In this example, the graph traversal was performed for the user's team. Thus, if the user's manager is part of the team, then a further traversal is not needed.

However, if the user's manager is not part of the user's team, then another graph traversal is need. If another traversal is needed, then the method 500 proceeds to operation 506 where the graph is traversed on different edges (e.g., manager edges) up to the manager to identify documents the manager has modified (e.g., additional context data).

In operation 508, the knowledge graph engine 306 determines the result. In some cases, the result can be received as a result of the graph traversal (e.g., operation 506). In other cases, the result is identifiable from the first graph traversal and the execution of the LLM prompt (e.g., when another traversal is not needed). The result is then presented in operation 414.

While examples discussed herein are directed to generating and searching enterprise knowledge graphs, concepts described herein are applicable to any type of knowledge graph (e.g., a non-enterprise knowledge graph). Therefore, example embodiments are not limited to searching enterprise knowledge graphs or data associated with an enterprise.

Figure 6:
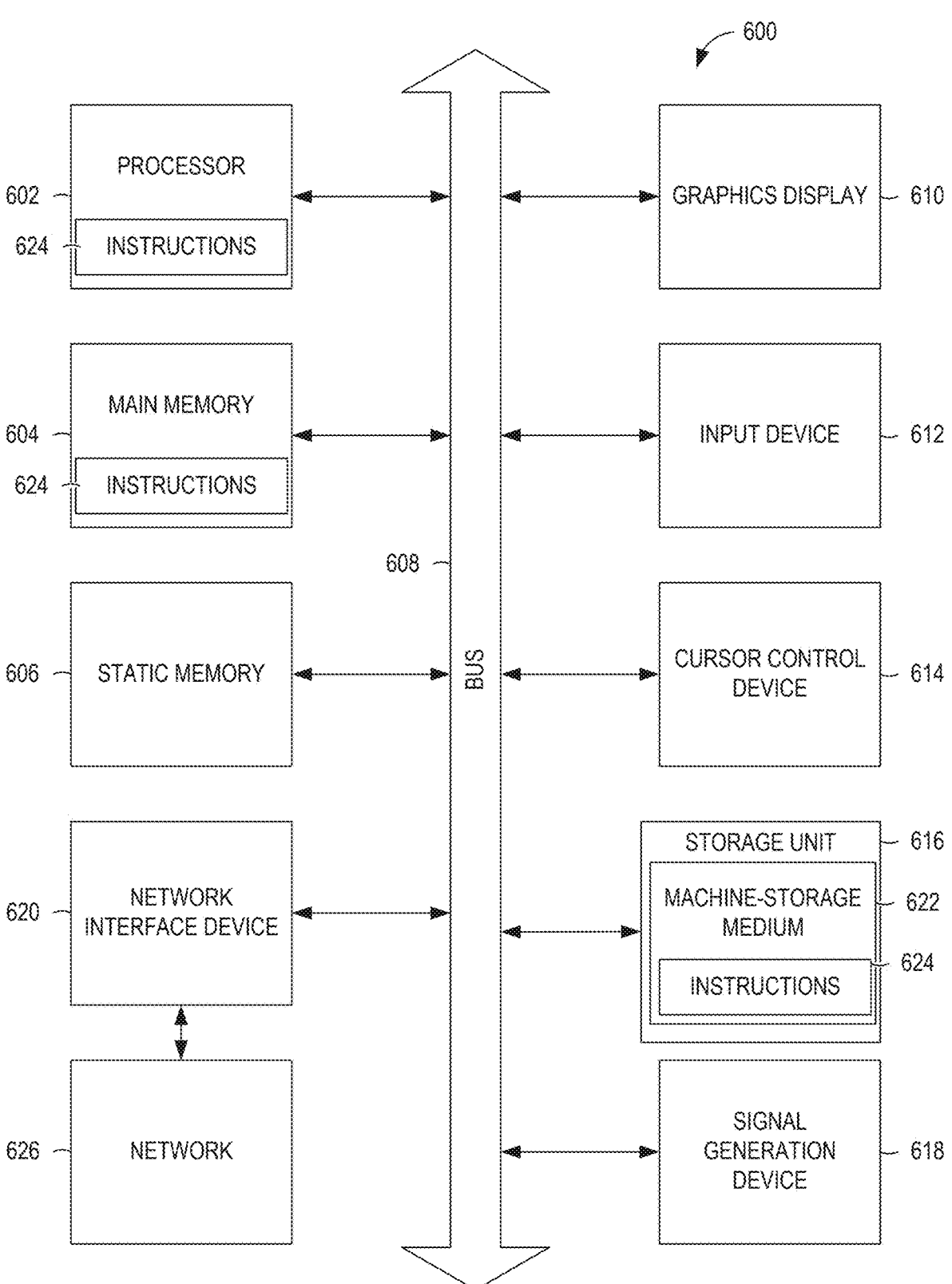
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 4 and FIG. 5. In one embodiment, the instructions 624 can transform the machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for incorporating large language model (LLM) prompts into graph queries using graph query language and executing these graph queries. The method comprises receiving, by a network system, a graph query that includes a large language model (LLM) prompt natively in a graph query language, the LLM prompt comprising an input context and a query to be answered based on the input context; based on the graph query, traversing, by the network system, a knowledge graph to obtain context data associated with the input context; invoking, by the network system, an LLM to determine a result by making a call to the LLM with the LLM prompt and the context data obtained from the traversal of the knowledge graph; and causing presentation of the result on a user interface of a client device.

In example 2, the subject matter of example 1 can optionally include wherein the knowledge graph comprises enterprise data with access control policies; and traversing the knowledge graph to obtain the context data is constrained by the access control policies for a user providing the query.

In example 3, the subject matter of any of examples 1-2 can optionally include wherein the knowledge graph comprises enterprise data with access control policies; and the method further comprises filtering the context data obtained from traversing the knowledge graph based on the access control policies for a user providing the query.

In example 4, the subject matter of any of examples 1-3 can optionally include causing presentation of a chat user interface for receipt of an input indicating the query; receiving, via the chat user interface, the input indicating the query; and in response to receiving the input, generating the graph query that includes the LLM prompt.

In example 5, the subject matter of any of examples 1-4 can optionally include wherein the chat user interface is associated with a productivity application; and causing presentation of the result comprises presenting the result in a format that can be incorporated into a document being edited through the productivity application.

In example 6, the subject matter of any of examples 1-5 can optionally include performing a further query of the graph query that filters on the result by using the result as anchors in the knowledge graph for the further query.

In example 7, the subject matter of any of examples 1-6 can optionally include wherein performing the further query comprises performing a second traversal of the knowledge graph to obtain additional context data.

In example 8, the subject matter of any of examples 1-7 can optionally include detecting that a size of the LLM prompt exceeds a maximum prompt size threshold; executing multiple parallel LLM prompts with parts of the context data to obtain partial response; and executing a subsequent LLM prompt that acts on the partial responses to obtain a final response, the final response being the result.

In example 9, the subject matter of any of examples 1-8 can optionally include receiving an input indicating the query in a natural language format; and in response to receiving the input, invoking a second LLM to generate the graph query that includes the LLM prompt.

In example 10, the subject matter of any of examples 1-9 can optionally include wherein causing presentation of the response comprises causing presentation of the result in a feed experience on the user interface of the client device.

In example 11, the subject matter of any of examples 1-10 can optionally include using the context data, generating a context table based on the input context indicated in the LLM prompt.

Example 12 is a system for incorporating large language model (LLM) prompts into graph queries using graph query language and executing these graph queries. The system comprises one or more processors and a memory storing instructions that, when executed by the one or more processors, cause the one or more processors to perform operations comprising receiving a graph query that includes a large language model (LLM) prompt natively in a graph query language, the LLM prompt comprising an input context and a query to be answered based on the input context; based on the graph query, traversing a knowledge graph to obtain context data associated with the input context; invoking an LLM to determine a result by making a call to the LLM with the LLM prompt and the context data obtained from the traversal of the knowledge graph; and causing presentation of the result on a user interface of a client device.

In example 13, the subject matter of example 12 can optionally include wherein the knowledge graph comprises enterprise data with access control policies; and traversing the knowledge graph to obtain the context data is constrained by the access control policies for a user providing the query.

In example 14, the subject matter of any of examples 12-13 can optionally include wherein the operations further comprise causing presentation of a chat user interface for receipt of an input indicating the query; receiving, via the chat user interface, the input indicating the query; and in response to receiving the input, generating the graph query that includes the LLM prompt.

In example 15, the subject matter of any of examples 12-14 can optionally include wherein the operations further comprise performing a further query of the graph query that filters on the result by using the result as anchors in the knowledge graph for the further query.

In example 16, the subject matter of any of examples 12-15 can optionally include wherein performing the further query comprises performing a second traversal of the knowledge graph to obtain additional context data.

In example 17, the subject matter of any of examples 12-16 can optionally include wherein the operations further comprise detecting that a size of the LLM prompt exceeds a maximum prompt size threshold; executing multiple parallel LLM prompts with parts of the context data to obtain partial response; and executing a subsequent LLM prompt that acts on the partial responses to obtain a final response, the final response being the result.

In example 18, the subject matter of any of examples 12-17 can optionally include wherein the operations further comprise receiving an input indicating the query in a natural language format; and in response to receiving the input, invoking a second LLM to generate the graph query that includes the LLM prompt.

In example 19, the subject matter of any of examples 12-18 can optionally include wherein the operations further comprise using the context data, generating a context table based on the input context indicated in the LLM prompt.

Example 20 is a method for incorporating large language model (LLM) prompts into graph queries using graph query language and executing these graph queries. The method comprises receiving, by a network system, an input indicating a query in a natural language format; in response to receiving the input, invoking a first large language model (LLM) to generate a graph query that includes a LLM prompt natively in a graph query language, the invoking comprising making a call by the network system to the first LLM, the LLM prompt comprising an input context and a query to be answered based on the input context; based on the graph query, traversing, by the network system, a knowledge graph to obtain context data associated with the input context; invoking, by the network system, a second LLM to determine a result by making a call to the second LLM with the LLM prompt and the context data obtained from the traversal of the knowledge graph; and causing presentation of the result on a user interface of a client device.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

receiving, by a network system, a graph query that includes a large language model (LLM) prompt natively in a graph query language, the LLM prompt comprising an input context and a query to be answered based on the input context;

based on the graph query, traversing, by the network system, nodes and edges of a knowledge graph to obtain context data, the context data being a subset of the nodes and edges of the knowledge graph based on the input context;

invoking, by the network system, an LLM to determine a result by making a call to the LLM with the LLM prompt and the context data obtained from the traversal of the knowledge graph, the LLM being prompted to determine the result by applying the query to the context data; and causing presentation of the result on a user interface of a client device.

2. The method of claim 1, wherein:

the knowledge graph comprises enterprise data with access control policies; and the traversing nodes and edges of the knowledge graph to obtain the context data is constrained by the access control policies for a user providing the query.

3. The method of claim 1, wherein:

the knowledge graph comprises enterprise data with access control policies; and the method further comprises filtering the context data obtained from traversing nodes and edges of the knowledge graph based on the access control policies for a user providing the query.

4. The method of claim 1, further comprising:

causing presentation of a chat user interface for receipt of an input indicating the query;

receiving, via the chat user interface, the input indicating the query; and in response to receiving the input, generating the graph query that includes the LLM prompt.

5. The method of claim 4, wherein:

the chat user interface is associated with a productivity application; and causing presentation of the result comprises presenting the result in a format that can be incorporated into a document being edited through the productivity application.

6. The method of claim 1, further comprising:

performing a further query of the graph query that filters on the result by using the result as anchors in the knowledge graph for the further query.

7. The method of claim 6, wherein the performing the further query comprises performing a second traversal of the nodes and edges of the knowledge graph to obtain additional context data.

8. The method of claim 1, further comprising:

detecting that a size of the LLM prompt exceeds a maximum prompt size threshold;

executing multiple parallel LLM prompts with parts of the context data to obtain partial response; and executing a subsequent LLM prompt that acts on the partial responses to obtain a final response, the final response being the result.

9. The method of claim 1, further comprising:

receiving an input indicating the query in a natural language format; and in response to receiving the input, invoking a second LLM to generate the graph query that includes the LLM prompt.

10. The method of claim 1, wherein the causing presentation of the result comprises causing presentation of the result in a feed experience on the user interface of the client device.

11. The method of claim 1, further comprising:

using the context data, generating a context table based on the input context indicated in the LLM prompt.

12. A system comprising:

one or more processors; and a memory storing instructions that, when executed by the one or more processors, cause the one or more processors to perform operations comprising:

receiving a graph query that includes a large language model (LLM) prompt natively in a graph query language, the LLM prompt comprising an input context and a query to be answered based on the input context;

based on the graph query, traversing nodes and edges of a knowledge graph to obtain context data, the context data being a subset of the nodes and edges of the knowledge graph based on the input context;

invoking an LLM to determine a result by making a call to the LLM with the LLM prompt and the context data obtained from the traversal of the knowledge graph, the LLM being prompted to determine the result by applying the query to the context data; and causing presentation of the result on a user interface of a client device.

13. The system of claim 12, wherein:

the knowledge graph comprises enterprise data with access control policies; and the traversing nodes and edges of the knowledge graph to obtain the context data is constrained by the access control policies for a user providing the query.

14. The system of claim 12, wherein the operations further comprise:

causing presentation of a chat user interface for receipt of an input indicating the query;

receiving, via the chat user interface, the input indicating the query; and in response to receiving the input, generating the graph query that includes the LLM prompt.

15. The system of claim 12, wherein the operations further comprise:

performing a further query of the graph query that filters on the result by using the result as anchors in the knowledge graph for the further query.

16. The system of claim 15, wherein the performing the further query comprises performing a second traversal of the nodes and edges of the knowledge graph to obtain additional context data.

17. The system of claim 12, wherein the operations further comprise:

detecting that a size of the LLM prompt exceeds a maximum prompt size threshold;

executing multiple parallel LLM prompts with parts of the context data to obtain partial response, and executing a subsequent LLM prompt that acts on the partial responses to obtain a final response, the final response being the result.

18. The system of claim 12, wherein the operations further comprise:

receiving an input indicating the query in a natural language format; and in response to receiving the input, invoking a second LLM to generate the graph query that includes the LLM prompt.

19. The system of claim 12, wherein the operations further comprise:

using the context data, generating a context table based on the input context indicated in the LLM prompt.

20. A method comprising:

receiving, by a network system, an input indicating a query in a natural language format;

in response to receiving the input, invoking a first large language model (LLM) to generate a graph query that includes a LLM prompt natively in a graph query language, the invoking comprising making a call by the network system to the first LLM, the LLM prompt comprising an input context and a query to be answered based on the input context;

based on the graph query, traversing, by the network system, nodes and edges of a knowledge graph to obtain context data, the context data being a subset of the nodes and edges of the knowledge graph based on the input context;

invoking, by the network system, a second LLM to determine a result by making a call to the second LLM with the LLM prompt and the context data obtained from the traversal of the knowledge graph, the LLM being prompted to determine the result by applying the query to the context data; and causing presentation of the result on a user interface of a client device.

* * * * *